United States Patent [19]

Gernet

[11] Patent Number: 4,963,009
[45] Date of Patent: Oct. 16, 1990

[54] OPTICAL ELEMENT FOR USE AS A TRANSPARENT VIEWING WINDOW

[76] Inventor: Hermann M. Gernet, 6, Dunantstrasse, 44 Münster, Fed. Rep. of Germany

[21] Appl. No.: 173,379

[22] Filed: Mar. 25, 1988

Related U.S. Application Data

[63] Continuation-in-part of Ser. No. 789,309, Dec. 17, 1985, abandoned.

[51] Int. Cl.$^5$ .............................................. G02B 27/00
[52] U.S. Cl. .................................... 350/453; 350/319
[58] Field of Search ......................... 350/453, 441, 319

[56] References Cited

U.S. PATENT DOCUMENTS 3,611,970 10/1971 Hagan et al. ......................... 350/319
4,213,029 7/1980 Endicott, Jr. et al. ............. 350/319

OTHER PUBLICATIONS

Gernet et al, "Intraokulare Optik in Klinik und Praxis", Rothacker, 1978.

Primary Examiner—Bruce Y. Arnold
Assistant Examiner—Rebecca D. Gass
Attorney, Agent, or Firm—Toren, McGeady & Associates

[57] ABSTRACT

An optical element of substantial thickness with a spherical convex surface and a spherical concave surface which are concentrically arranged. This optical element, combined with an adequate plus-power effect of the slightly and physiologically accommodating human eye lenses of the normal-sighted observer's eyes, which for the desired distance vision compensate the weakly negative refractive power of the optical element, as a transparent viewing window, is brought into a suitable position near the observer's emmetropic eyes. This combined system presents a real telescope in contrast to the hitherto known concentric lenses.

2 Claims, 1 Drawing Sheet

OPTICAL ELEMENT FOR USE AS A TRANSPARENT VIEWING WINDOW

CROSS-REFERENCE TO RELATED APPLICATIONS

This application is a continuation-in-part of U.S. patent application Ser. No. 789,309, filed Dec. 17, 1985, now abandoned.

BACKGROUND OF THE INVENTION

1. Field of the Invention

The invention relates to an optical element for use as a viewing window which produces, together with the observer's slightly accommodating eyes, a considerable magnification of the seen far objects and a large field of vision.

2. Description of Related Art

There are telescopes generally known equipped with a tube containing the arrangement of lenses and, therefore, are unable to produce a wide field of vision. Arrangements like these are of no use as a transparent viewing window in vehicles, astronaut's helmets, etc.

There are also known telescope spectacles for far vision, the magnifying power of which are small, but which can nevertheless be worn by the user without further manipulation. An attempt to increase the magnifying power would inevitably lead to a reduction of the field of vision and to an unhandiness of such spectacles.

U.S. Pat. No. 3,611,970 discloses that a transparent viewing window for submarines is known, which correlates to the subject invention. However, even with an optimum approximation of the observer's eyes to the inner surface, this generally known transparent viewing window cannot produce an efficient magnification since the thickness of the transparent viewing window, with respect to the inner and outer radii, is not big enough. The theoretically possible magnification of this transparent viewing window has not been explained; rather it is explained that the thickness of the transparent material can be reduced by the spherical form of the observation dome at a constant resistance to pressure.

SUMMARY OF THE INVENTION

An object of the present invention is to provide an optical element with a magnifying power which serves as a transparent viewing window and whose field of vision is considerably larger than that of other telescopes, and whose magnification is considerably larger than that of other hitherto known transparent viewing windows.

The above object is achieved in an optical element for use as a transparent viewing window, curved around the user's eyes, made of a curved, concentric optical material, such as glass or synthetic material, with a spherical convex surface which is distinguished in the following way: a refractive index n from 1.70 to 1.93, a thickness d from 0.06 m. to 0.32 m., an outer radius r1 of spherical curvature from 0.15 m. to 0.54 m., an inner radius r2 of spherical curvature from 0.09 m. to 0.22 m., and a center of curvature which is identical with the outer and the inner curve.

In other words, the invention develops an optical element of substantial thickness with a spherical convex surface and a spherical concave surface which are concentrically arranged as correlatives. This optical element, combined with an adequate plus-power effect of the slightly and physiologically accommodating human eye lenses of the normal-sighted observer's eyes, which for the desired distance vision compensate the weakly negative refractive power of the optical element, as a transparent viewing window, is brought into a suitable position near the observer's emmetropic eyes. This combined system presents a real telescope in contrast to the hitherto known concentric lenses.

Another object of the invention is to create, by a well known spherical shaping while maintaining the respective axial thickness of the optical element, an additional dioptric effect for the compensation of symmetrical refractive errors of the observer's eyes instead of the concentric spherical make-up, e.g., the steepening of the outer surface. Such an optical element for telescope spectacles is a new binocular device, i.e., a binocle.

This object is achieved in an optical element for use as a transparent viewing window or a binocle, curved around the user's eyes, made of a curved, concentric optical material, such as glass or synthetic material, with a spherical and convex surface which is distinguished in the following way: a refractive index n from 1.70 to 1.93, a thickness d from 0.06 m. to 0.32 m., an outer radius r1 of spherical curvature from 0.15 m. to 0.54 m., an inner radius r2 of spherical curvature from 0.09 m. to 0.22 m., and a center of curvature which is not identical with the outer and the inner curve, but with a center of curvature of the outer curve positioned in front of the center of curvature of the inner curve in the case of an optical pass of light from the left to the right.

BRIEF DESCRIPTION OF THE DRAWING

With the above and additional objects and advantages in mind as will hereinafter appear, the invention will be described with reference to the accompanying drawing, in which.

DESCRIPTION OF THE PREFERRED EMBODIMENTS

Figure 1:
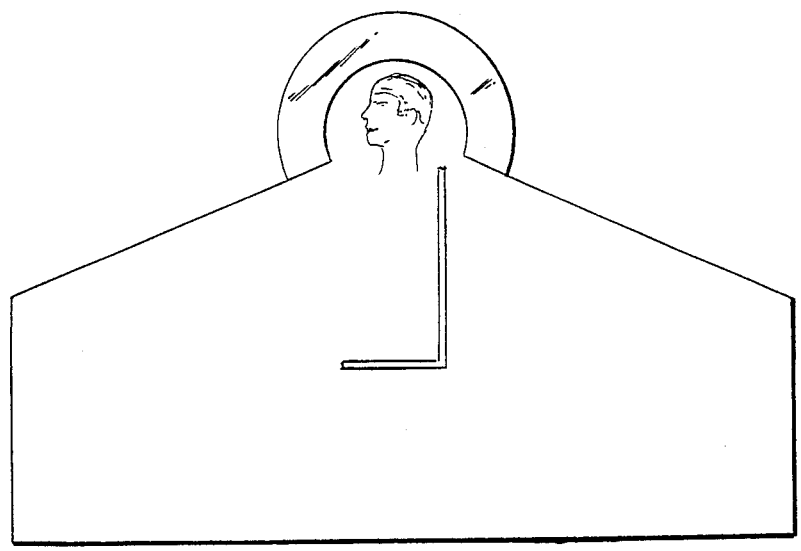
FIG. 1 shows a first embodiment of the optical element of the subject invention.

FIG. 1 shows an optical element for use as a transparent viewing window. This optical element has an outer radius of 0.54 m., an inner radius of 0.22 m., a thickness of 0.32 m., and a refractive index of 1.93 (an optical material with a high refractive index). The magnifying formula is:

$$V = 1/(1 - (d/n)D)$$

where V is the magnifying power of the optical element, d is the thickness in meters, n is the refractive index, and D is the refractive power of the outer surface in Diopters. The optical element shown in FIG. 1 ($-1.3$ Diopters refractive power) leads to a magnification of 1.39 (39%) when the accommodating and thus the small minus power ($-1.3$ Diopters) of the optical element compensating observer's eyes are optimally near to the inner wall, to 1.35 (35%) when the inner distance of the eyes is 15 mm.

Figure 2:
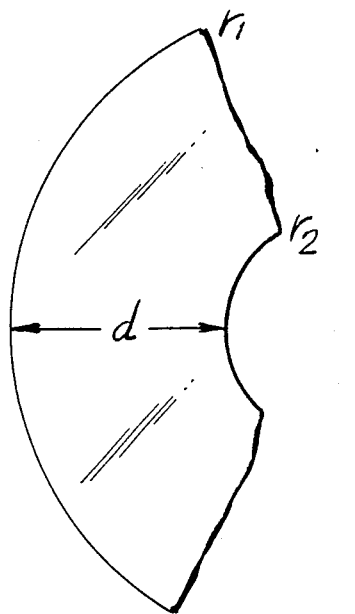
FIG. 2 shows, on a larger scale, of a portion of the optical element.
Figure 4:
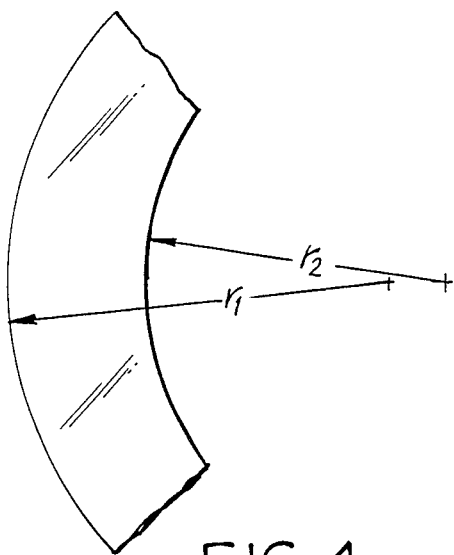
FIG. 4 shows a portion of another embodiment of the invention.

FIG. 2 shows an optical element with an outer radius r1 of 0.30 m. and an inner radius r2 of 0.10 m. The optical element is made of bullet-proof synthetic material with a refractive index of n=1.70 and a thickness of d=0.20 m. This optical element leads to a magnification of 1.38 (38%) when there is a maximum nearing of the observer's eyes to the inner wall.

Figure 3:
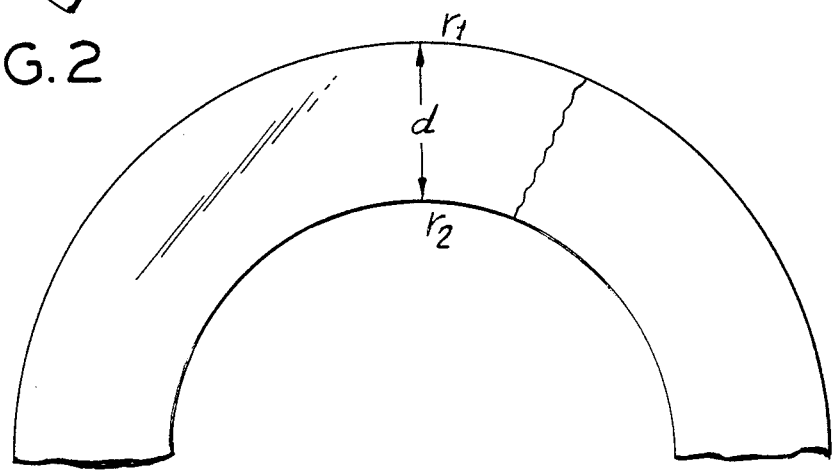
FIG. 3 shows a portion of the optical element having different dimensions.

FIG. 3 shows an optical element with an outer radius r1 of 0.15 m. and an inner radius r2 of 0.09 m. The optical element is made of synthetic material with a refractive index n of 1.70 and a thickness d of 0.06 m. This optical element leads to a magnification of 1.20 (20%) when there is a maximum nearing of the observer's eyes to the inner wall.

The above described optical elements can either be positioned as observation domes in vehicles or as immobile elements, but they can also be positioned as transparent viewing window sectors in vehicles, in helmets, in binocles or as immobile elements.

Numerous alterations of the structure herein disclosed will suggest themselves to those skilled in the art. However, it is to be understood that the described embodiments are for purposes of illustration only and are not to be construed as a limitation of the invention. All such modifications which do not depart from the spirit of the invention are intended to be included within the scope of the appended claims.

What is claimed is:

1. A telescope-like optical element with magnifying power for use as a transparent viewing window, curved around the user's eyes, made of a curved optical material with spherical inner and outer surfaces, said optical element having a refractive index n from 1.70 to 1.93, a thickness d from 0.06 m. to 0.32 m., an outer radius r1 of spherical curvature from 0.15 m. to 0.54 m., an inner radius r2 of spherical curvature from 0.09 m. to 0.22 m., wherein the center of curvature of the outer surface is identical with the center of curvature of the inner surface.

2. A telescope-like optical element with magnifying power for use as a transparent viewing window curved around the user's eyes, made of a curved optical material with spherical inner and outer surfaces, said optical element having a refractive index n from 1.70 to 1.93, a thickness d from 0.06 m. to 0.32 m., an outer radius r1 of spherical curvature from 0.15 m. to 0.54 m., an inner radius r2 of spherical curvature from 0.09 m. to 0.22 m., wherein the center of curvature of the outer surface is spaced apart from the center of curvature of the inner surface.

* * * * *